A. A. ROTHROCK.
WRIST PIN TRUING DEVICE.
APPLICATION FILED MAY 5, 1913.

1,084,038.

Patented Jan. 13, 1914.

WITNESSES:

INVENTOR
Andrew A. Rothrock
BY
Joshua R. H. Potts
ATTORNEY

UNITED STATES PATENT OFFICE.

ANDREW A. ROTHROCK, OF ERIE, PENNSYLVANIA, ASSIGNOR OF ONE-HALF TO SIDNEY E. GESNER, OF ERIE, PENNSYLVANIA.

WRIST-PIN-TRUING DEVICE.

1,084,038.  Specification of Letters Patent.  Patented Jan. 13, 1914.

Application filed May 5, 1913. Serial No. 765,506.

*To all whom it may concern:*

Be it known that I, ANDREW A. ROTHROCK, a citizen of the United States, residing at Erie, county of Erie, and State of Pennsylvania, have invented certain new and useful Improvements in Wrist-Pin-Truing Devices, of which the following is a specification.

This invention relates to crank pin truing devices, and is especially adapted to be used in connection with crank, or wrist pins upon locomotive driving wheels.

The primary object of my invention is to provide a device which may be efficiently used in truing the crank, or wrist pins upon locomotive driving wheels, after removing the driving rods therefrom, and thereby obviating the necessity of removing the pin, or wheel from the locomotive.

A further object of my invention is to provide a wrist pin truing device which may be held securely in position adjacent the locomotive driving wheel, and which, during the truing operation, will automatically feed itself in its cutting operation.

With these objects in view, together with others which will appear as the nature of the invention is better understood, my invention comprises generally a cylindrical rotatable tool stock mounted upon a stub shaft, carrying at its outer end a plurality of cutting tools, and means for rotating the said tool stock upon the shaft.

My invention further comprises a crank pin truing device characterized as above, the stub shaft upon which the tool carrying stocks is mounted being screw threaded so that, when the said tool stock is rotated, the cutting tools will be advanced along the crank pins.

My invention will be more readily understood by reference to the accompanying drawings forming a part of this specification, and in which—

Figure 1:
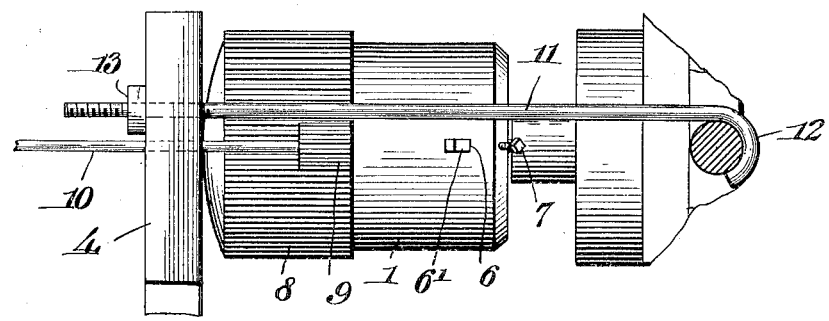
Figure 2:
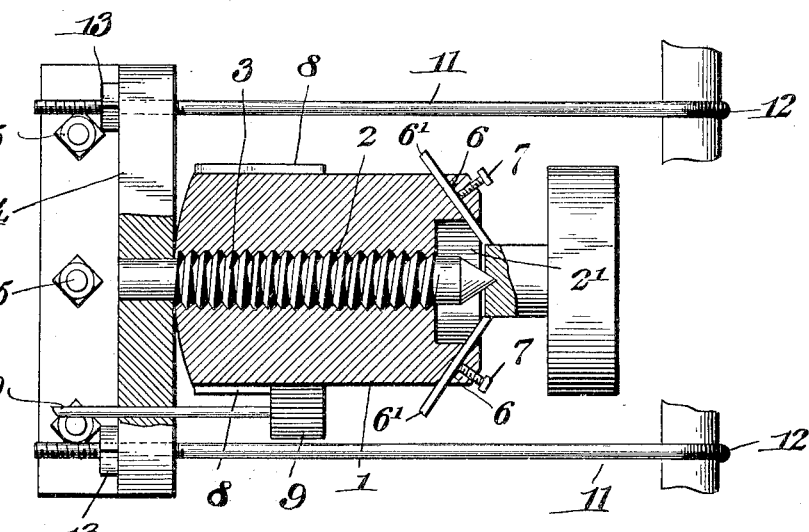

Figure 1 is a side elevation of a crank pin truing device constructed in accordance with my invention, and illustrating the same applied to the crank pin upon a locomotive driving wheel, and Fig. 2 is a plan view of the device, the rotatable tool stock and parts adjacent thereto being shown in section.

Referring now more particularly to the drawings, 1 represents generally a cylindrical rotatable tool stock, provided with a central screw threaded bore 2, and which is adapted to be mounted upon the threaded stub shaft 3. The shaft 3 is rigidly secured to a bracket 4, which is secured as by bolts 5 in a position adjacent the track, so that the wrist pin upon the wheel may be brought in alinement with the shaft 3, and is pointed at its outer end at 2' to be readily inserted within the centering hole in the end of the wrist pin. The outer end of the rotatable tool stock is provided with a recess 2', sufficient in width and diameter to accommodate different size crank pins, the walls of the tool stock 1 adjacent the recess being provided with a plurality of obliquely disposed openings 6, through which the cutting tools 6' are projected, and may be adjusted to different size wrist pins by the set screws 7. This construction also provides means for taking up wear in the tools.

The cylindrical tool stock is provided upon its periphery adjacent its inner end with a series of gear teeth 8, which are engaged by a pinion 9 mounted upon the end of a shaft 10. The gear teeth 8 extend longitudinally of the cylindrical tool stock a distance sufficient to be in constant engagement with the fixed pinion 9 at all times during the longitudinal movement of the tool stock on the shaft 3. From this construction it will be obvious that when the device is properly centered upon the crank, or wrist pin of a locomotive driving wheel, rotation of the tool stock 1, through power applied to the shaft 10, and imparted to the said tool stock through the gearing 8, and pinion 9, will cause the cutting tool 6 to perform a cutting operation upon the wrist pin, and as the tool stock rotates upon its threaded stub shaft, the tools, together with the tool stock, will be gradually forced outwardly until the entire surface of the wrist pin has been treated.

For the purpose of securing the device more firmly in position adjacent the wrist pin, a pair of hook shaped bars 11 are provided, which, at their outer hooked end 12, are adapted to engage over the spokes of the locomotive driving wheels, the inner ends of the said bars being adjustably mounted upon the bracket 4, in order that various adjustments may be made. To this end I extend the inner ends of the bars 11 through perforations provided in the bracket 4, the said ends of the bars being threaded to receive the adjusting nuts 13.

The arrangement of the several parts of the device obviously makes the same applicable to the wrist pin of a locomotive driving wheel without the necessity of removing the pin, or wheel from the locomotive, yet which will prove most efficient in its operation.

While in the above, I have described my invention in its preferred form, it is to be understood that minor changes in the construction, and arrangement of the several parts may be resorted to without departing from the spirit of my invention; it is also to be understood that the use of the device need not necessarily be restricted to crank or wrist pins, but that it may be used with equal facility upon axles and journals of various types.

I claim:

1. In a device of the class described, a bracket, a screw threaded shaft having one end rigidly secured in said bracket and pointed at the other end to fit into the centering hole in the end of a journal, said bracket being provided with a pair of apertures one located laterally upon each side of said shaft, a pair of bars each having a threaded end extending through said apertures respectively, nuts threaded upon the ends of said bars, the opposite ends of said bars being provided with hooks for engagement over the spokes of the wheel whereby when the said nuts are tightened upon the bars the said threaded shaft will be forced in engagement with the end of said journal, an interiorly threaded stock rotatably mounted upon said shaft, cutting tools secured upon said stock, and means for rotating said stock, substantially as described.

2. In a device of the class described, a bracket, a screw threaded shaft having one end rigidly secured in said bracket, and pointed at the other end to fit into the centering hole in the end of a journal, means for attaching said bracket to the wheel to clamp said shaft in position, an interiorly threaded stock rotatably mounted upon said shaft, cutting tools secured upon said stock, and means for rotating said stock, substantially as described.

In testimony whereof I have signed my name to this specification in the presence of two subscribing witnesses.

ANDREW A. ROTHROCK.

Witnesses:
 ROBERT H. CHINNOCK,
 JOHN B. EICHENLAUB.